(12) United States Patent
Massara et al.

(10) Patent No.: US 8,042,961 B2
(45) Date of Patent: Oct. 25, 2011

(54) AUDIO LAMP

(76) Inventors: Andrew Massara, Potomac Falls, VA (US); Jaron Rothkop, Royal Oak, MI (US)

( * ) Notice: Subject to any disclaimer, the term of this patent is extended or adjusted under 35 U.S.C. 154(b) by 251 days.

(21) Appl. No.: 12/326,881

(22) Filed: Dec. 2, 2008

(65) Prior Publication Data
US 2009/0196016 A1 Aug. 6, 2009

Related U.S. Application Data

(60) Provisional application No. 60/991,754, filed on Dec. 2, 2007.

(51) Int. Cl.
*H04M 1/22* (2006.01)
*F21V 33/00* (2006.01)

(52) U.S. Cl. ............... 362/86; 362/253; 362/249.02; 381/124

(58) Field of Classification Search .......... 362/86–88, 362/253, 800, 230, 234, 249.02–249.06, 362/650, 651, 240, 241; 381/124
See application file for complete search history.

(56) References Cited

U.S. PATENT DOCUMENTS

| | | |
|---|---|---|
| 1,272,843 A | 7/1918 | Pape |
| 2,083,753 A | 6/1937 | Turner |
| 2,501,968 A | 3/1950 | Sassin |
| 2,924,661 A | 2/1960 | Messeas, Jr |
| 3,023,830 A | 3/1962 | Hammes |
| 3,194,952 A | 7/1965 | Wells |
| 4,214,298 A | 7/1980 | Propst |
| 4,280,019 A | 7/1981 | Propst et al. |
| 4,433,363 A | 2/1984 | Weber |
| 4,528,620 A | 7/1985 | Weber |
| 4,776,018 A | 10/1988 | Cordier |
| 5,477,205 A | 12/1995 | Burns |
| 5,828,765 A | 10/1998 | Gable |
| 5,980,057 A | 11/1999 | Christie |
| 5,995,634 A | 11/1999 | Zwolski |
| 6,149,283 A * | 11/2000 | Conway et al. ............ 362/236 |
| 6,200,022 B1 | 3/2001 | Hammiche et al. |
| 6,558,032 B2 | 5/2003 | Kondo et al. |
| 6,630,800 B2 | 10/2003 | Weng |
| 6,748,096 B2 | 6/2004 | Chuang |
| 7,029,150 B2 | 4/2006 | Finch |
| 7,438,447 B2 | 10/2008 | Holder et al. |
| 7,455,435 B2 | 11/2008 | Mathews et al. |
| 7,467,881 B2 * | 12/2008 | McMillen ............... 362/364 |
| 7,479,662 B2 | 1/2009 | Soules et al. |
| 7,535,341 B2 | 5/2009 | Haase |
| 7,604,378 B2 * | 10/2009 | Wolf et al. ................ 362/253 |
| 2003/0127990 A1 | 7/2003 | Weng |
| 2003/0220705 A1 | 11/2003 | Ibey |
| 2005/0078837 A1 | 4/2005 | Hornback |

(Continued)

*Primary Examiner* — Bao Q Truong
(74) *Attorney, Agent, or Firm* — Capitol City TechLaw PLLC

(57) ABSTRACT

In one embodiment, this invention discloses a device that is a lamp on the one hand, and also a speaker on the other, comprising a light-emitting element, a surface that acts as a sound-emitting element, and a base socket that can fit to an ordinary household lamp socket. The surface can be translucent and act as a lamp cover at the same time. There is also an electronic assembly in the lamp that controls both the light-emitting and sound-emitting elements, as well as communicates with an external host or other devices. In another embodiment, the lamp cover can also couple with an acoustic-wave transducer unit so that the audio lamp device becomes a light and a microphone. Various sensors can also be equipped within the audio lamp, and the results can be sent to the external host through the electronic assembly.

14 Claims, 17 Drawing Sheets

U.S. PATENT DOCUMENTS

| | | |
|---|---|---|
| 2005/0128743 A1 | 6/2005 | Chuey et al. |
| 2005/0168986 A1* | 8/2005 | Wegner .................. 362/241 |
| 2005/0185392 A1 | 8/2005 | Walter et al. |
| 2007/0064433 A1 | 3/2007 | Wright |
| 2007/0109763 A1* | 5/2007 | Wolf et al. ................ 362/86 |
| 2007/0223723 A1 | 9/2007 | Haase |
| 2008/0143495 A1 | 6/2008 | Haase |
| 2008/0225510 A1* | 9/2008 | Rocha ..................... 362/86 |
| 2008/0298045 A1 | 12/2008 | Wright |
| 2009/0207607 A1 | 8/2009 | Haase et al. |

* cited by examiner

AUDIO LAMP

FIELD OF INVENTION

This invention relates to an electronic illumination device, and in particular a combination of a light-emitting device and a sound-emitting device.

BACKGROUND OF INVENTION

Lamp and speaker are the most common devices for emitting light and sound respectively. However, few have tried to combine the two elements together. U.S. Pat. No. 3,194,952 is one of the first attempts to combine the two together. It disclosed a light and speaker combination that is used outdoors. The light is supported from the ground, and the audio signal must be wired from an external source.

U.S. Pat. No. 5,980,057 disclosed a speaker light unit connected to conventional electrical light socket. However, an incandescent light bulb is used in the unit, and such a light bulb is inefficient and produces a lot of heat. It also uses a conventional speaker, which takes up a lot of space, and also forces the speaker to be mounted behind the light bulb for light propagation, making sound propagation impeded by the other structures in the unit, and resulting in less-than-ideal quality.

BRIEF DESCRIPTION OF FIGURES

FIG. 1b is a top view of the embodiment of FIG. 1a.

FIG. 2a is a cross-sectional view along the line A-A' of FIG. 1a.

DETAILED DESCRIPTION

As used herein, "couple" or "connect" refers to electronic and/or electrical coupling or connection either directly or indirectly via one or more electrical or electronic means unless otherwise stated. The terms "attached" or "mounted" also refer to either direct or indirect mechanical connection.

In one embodiment, this invention discloses a device that is a lamp on the one hand, and also a speaker on the other. This audio lamp comprises a light-emitting element, a surface that acts as a sound-emitting element, and a base socket. The surface can be translucent and act as a lamp cover at the same time. The base socket may be selected according to user need, such as one that fits into an ordinary household lamp socket. There is also an electronic assembly inside the lamp that controls both the light-emitting and sound-emitting elements, as well as communicates with an external host or other devices.

In an alternative embodiment, the lamp cover is coupled with an acoustic-wave transducer unit so that the audio lamp device becomes a light and a microphone. The audio signal picked up by the microphone can then be sent to the external host or other devices via the electronic assembly.

In yet another embodiment, the audio lamp device is also equipped with various sensors. The signals detected by the sensors can also be sent to the external host or other devices via the electronic assembly. The sensors include, but not limited to, smoke-detecting sensor, human location detection sensor, intrusion-detection sensor, etc.

There can be different combination of the features and capabilities of the audio lamp devices. Moreover, one or more of these devices can be grouped together into zones. Together with an external source and/or controller, the entire system as a whole can be programmed and configured to realize many useful applications. This will be explained in more details in the following sections.

Figure 1A:
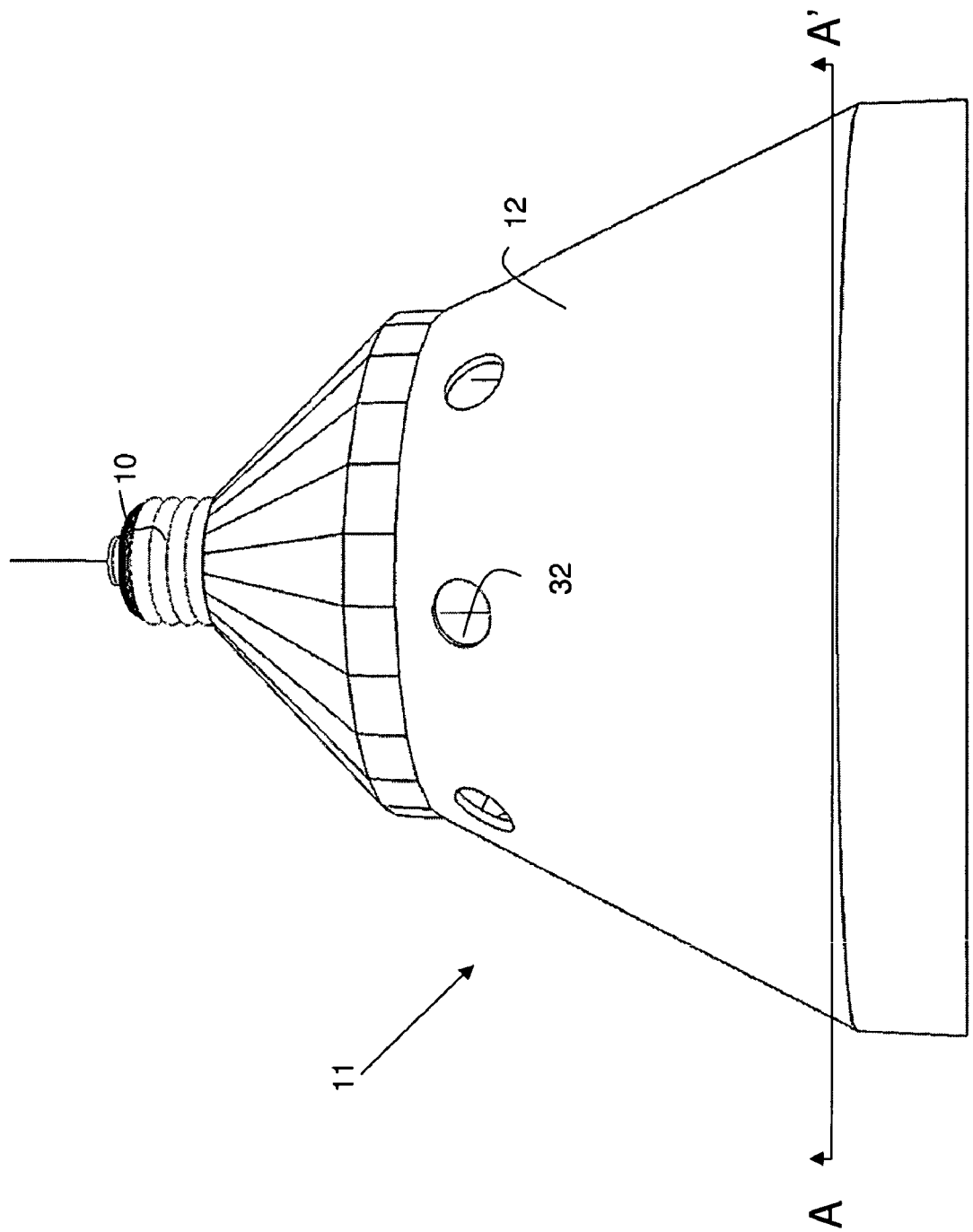
FIG. 1a is a side view of an audio lamp according to an embodiment.

Referring to FIG. 1a, a first embodiment of the present invention is an audio lamp 11 that can be plugged or inserted into a light socket. In this embodiment, a screw thread contact 10 is used to screw onto the light socket. A housing 12 is attached to the screw thread contact 10. Ventilation holes 32 are created in the housing for ventilation. An electronic assembly (not shown in figure) is provided inside the top part of the housing 12. The electronic assembly may include a power supply, one or more wireless transmitter and receiver (hereafter refer as transceiver), a micro-controller with memory, environmental sensors, a digital signal processing (DSP) chip, and any combination thereof. A surface ring 26 (not shown in figure) can be optionally attached to the housing 12 for decorative purpose.

Figure 1B:
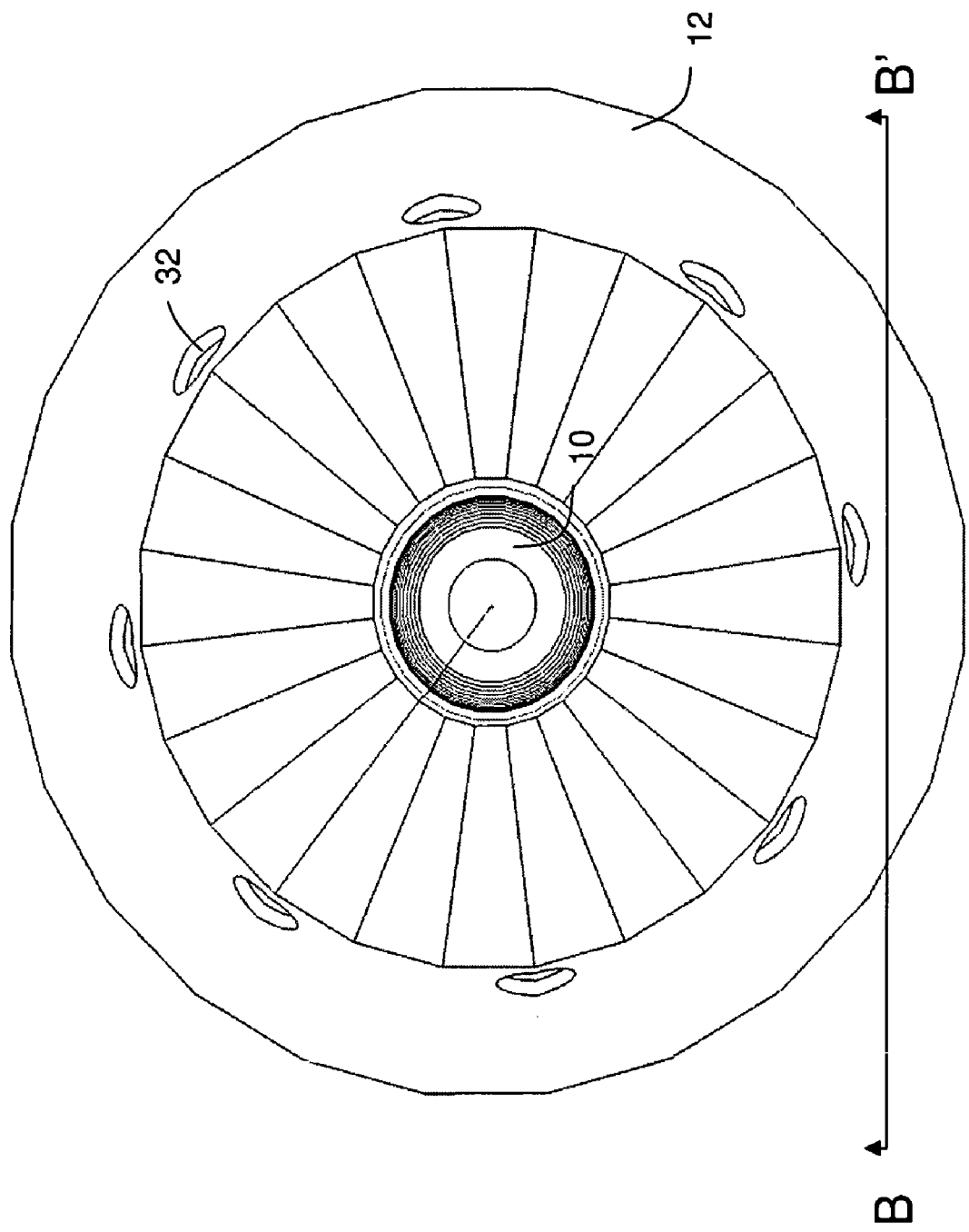
Figure 2A:
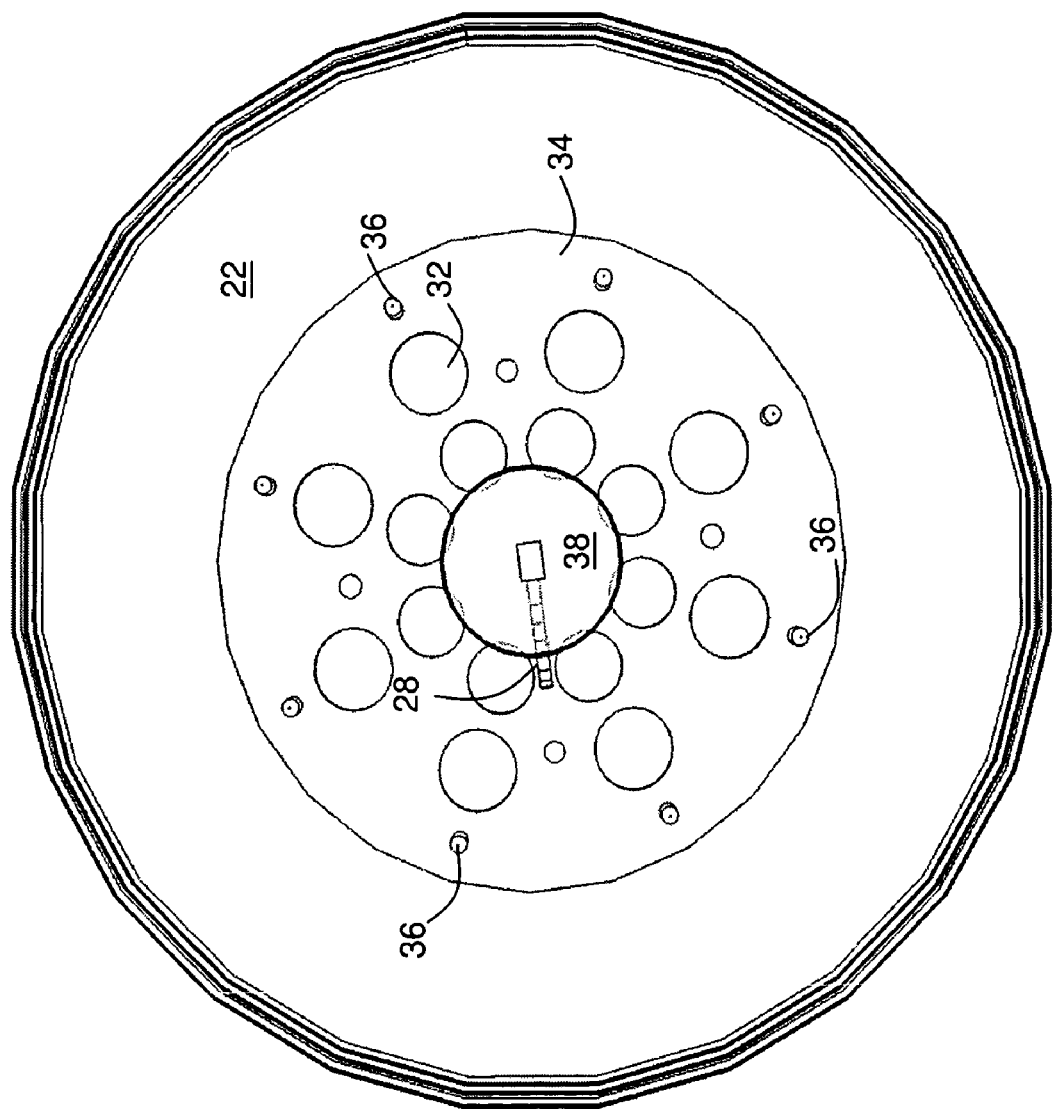

FIG. 1b shows the 'top-down' view of the audio lamp when viewing on top of the screw thread contact downward. The internal components of one embodiment of the audio lamp 11 are further shown in FIGS. 2a and 2b. FIG. 2a is the bottom view cut along the line labeled [A-A'] while FIG. 2b is the side view with part of the housing 12 cut out along the line labeled [B-B'] as shown in FIG. 1b so that the internal component can be visualized.

Figure 2B:
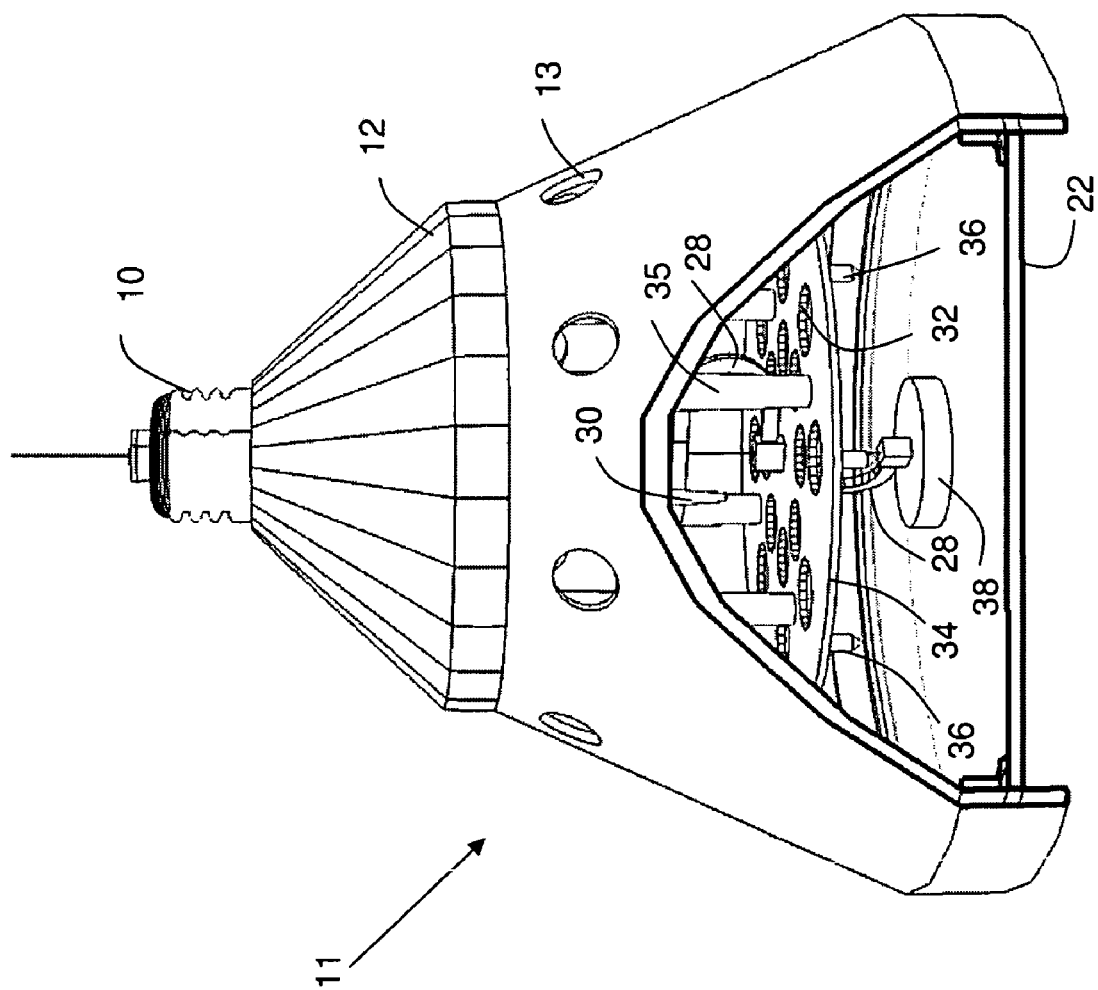
FIG. 2b is a cross-sectional view along the line B-B' of FIG. 1b.

Refer now to FIGS. 2a and 2b, a printed circuit board 34 is attached to the housing 12 by support poles 35, and electrically coupled to the electronic assembly through an electrical harness 28. Light emitting diodes (LED) 36 are installed on the printed circuit board 34, facing downwards. Ventilation holes 32 are provided on the printed circuit board 34 so that heat generated from the LEDs and other electronic components can be diffused upward. A lamp cover 22 is provided below the printed circuit board 34 attached to the housing 12. An electro-acoustic transducer, hereafter known as the exciter 38 is physically coupled to the lamp cover 22, and electronically coupled to the electronic assembly through an extension of the electrical harness 28. FIG. 2b also shows an antenna 30 that is coupled to the electronic assembly In one mode of operation, the lighting aspect of the audio lamp can work as follows. The LEDs 36 emit light when it receives electrical power from the electronic assembly through the electrical harness 28. The light passes through the lamp cover 22 into the environment. The ventilation holes 32 allow air to flow through, so that hot air generated by the heating up of the LEDs 36 and other electronic components such as the printed circuit board 34 and the electronic assembly may flow upwards and through ventilation holes 32 to escape from the audio lamp 11.

As for the audio aspect of this device, the lamp cover 22, apart from the usual function of allowing light to pass through and protecting the light source, also acts as a sound emitting element in this invention. As an illustration, this can be achieved using the distributed mode loudspeaker technology. Digital audio data is received at the antenna 30 from an external source or other devices and sent to the electronic assembly. The latter produces electrical power and sends through electrical harness 28 to drive the exciter 38. The exciter 38 then actuates the lamp cover 22 to emit sound. Using the distributed mode loudspeaker technology as an example, the excitation induces multiple organized bending resonances in the lamp cover 22, producing a complex vibration and in turn creating the acoustic waveform corresponding to the audio signal. The lamp cover 22 can be made from a variety of materials and in any shape and size. In this illustration, the lamp cover 22 is made of rigid material.

Multiple audio lamps can be used to output different audio channels. In one embodiment, a lamp outputs a left channel of a stereo output and another lamp outputs the right channel. In another embodiment, five audio lamps are used to output a left front channel, left rear channel, right front channel, right rear channel and a center channel respectively, or any combination as desired by the user.

Figure 3:
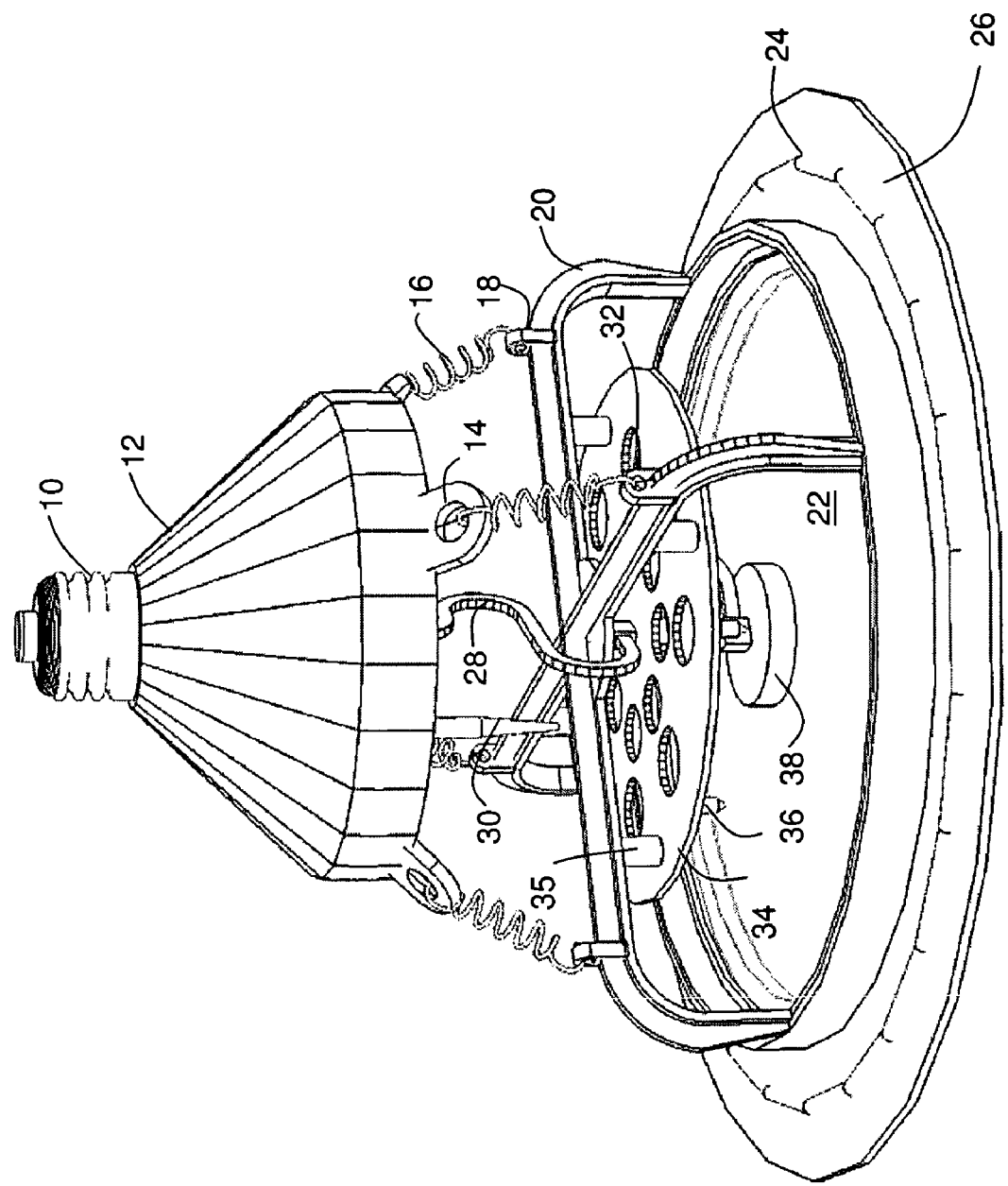
FIG. 3 is a perspective view of an alternative embodiment of the audio lamp with vibration insulation elements.

In another embodiment as described in FIG. 3, housing attachment rings 14 are attached to the housing 12. Springs 16 are hooked to the housing attachment rings 14 at one end, while the other end is hooked to armature attachment rings 18. The latter in turn are then attached to an armature 20. The printed circuit board 34 is attached to the armature 20 through the support poles 35. An insulating gasket 24 is attached to the surface ring 26. The material of the gasket can be rubber, neoprene, or other insulating material. While FIG. 3 depicts this embodiment when all the components are assembled together, FIG. 4 shows the individual components in more details.

Figure 4:
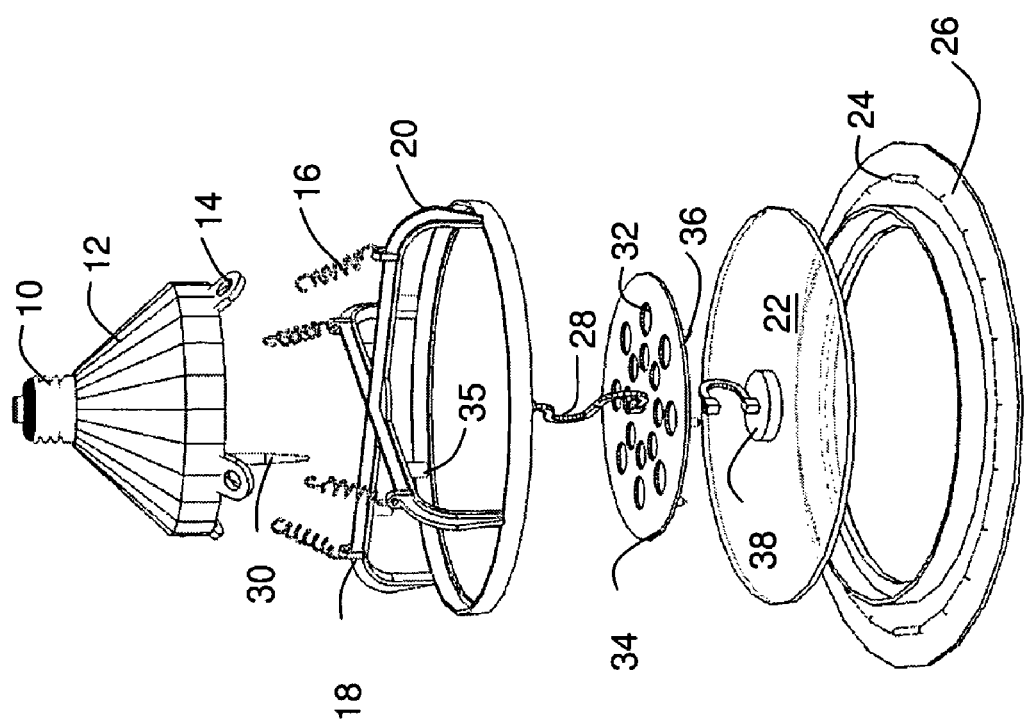
FIG. 4 is an exploded assembly of the embodiment of FIG. 3.

The purpose of the springs 16 and the insulating gasket 24 in FIGS. 3 and 4 is to dampen the vibration that is induced to other parts of the audio lamp from the exciter 38 and the lamp cover 22. This is needed because the vibration may generate rattling noise between the screw thread contact 10 and the light socket. It may also rattle other pieces of the assembly in the ceiling light fixture when rigidly connected as in FIG. 1.

Figure 5:
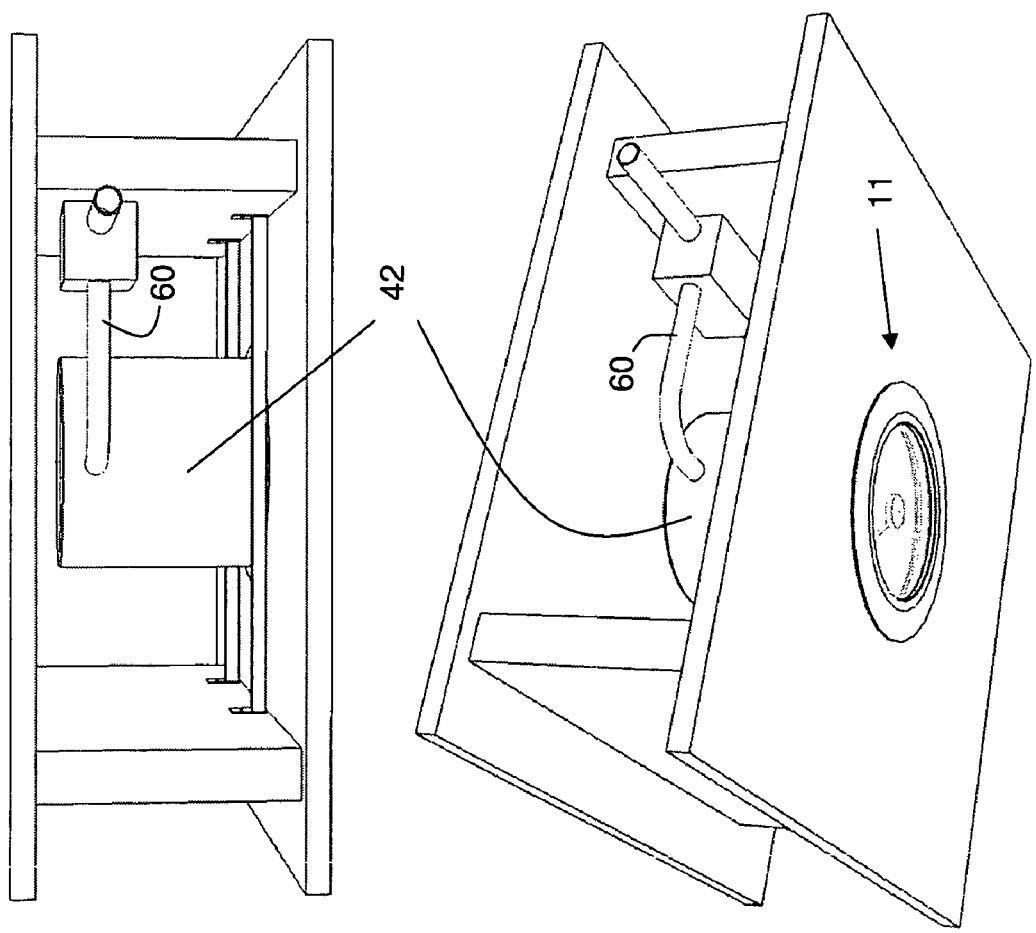
FIG. 5 is a diagram of the outlook of the audio lamp when installed into a CAN light socket.

In one embodiment, the shape and dimension of the audio lamp 11, including the screw thread contact 10, is made compatible to an ordinary lamp. As such, it is then possible for even an ordinary person to replace an ordinary ceiling lamp with this audio lamp, and the person can immediately enjoy all its benefits. In another embodiment, the audio lamp 11 may replace a lamp in a CAN light or recessed light fixture 42 in a building as shown in FIG. 5. In this setting, the power comes from a power line 60. In yet another embodiment, the entire CAN light or recessed lamp assembly is a dedicated audio lamp assembly that includes an audio lamp 11 which may be installed at newly constructed or renovated buildings.

Figure 6:
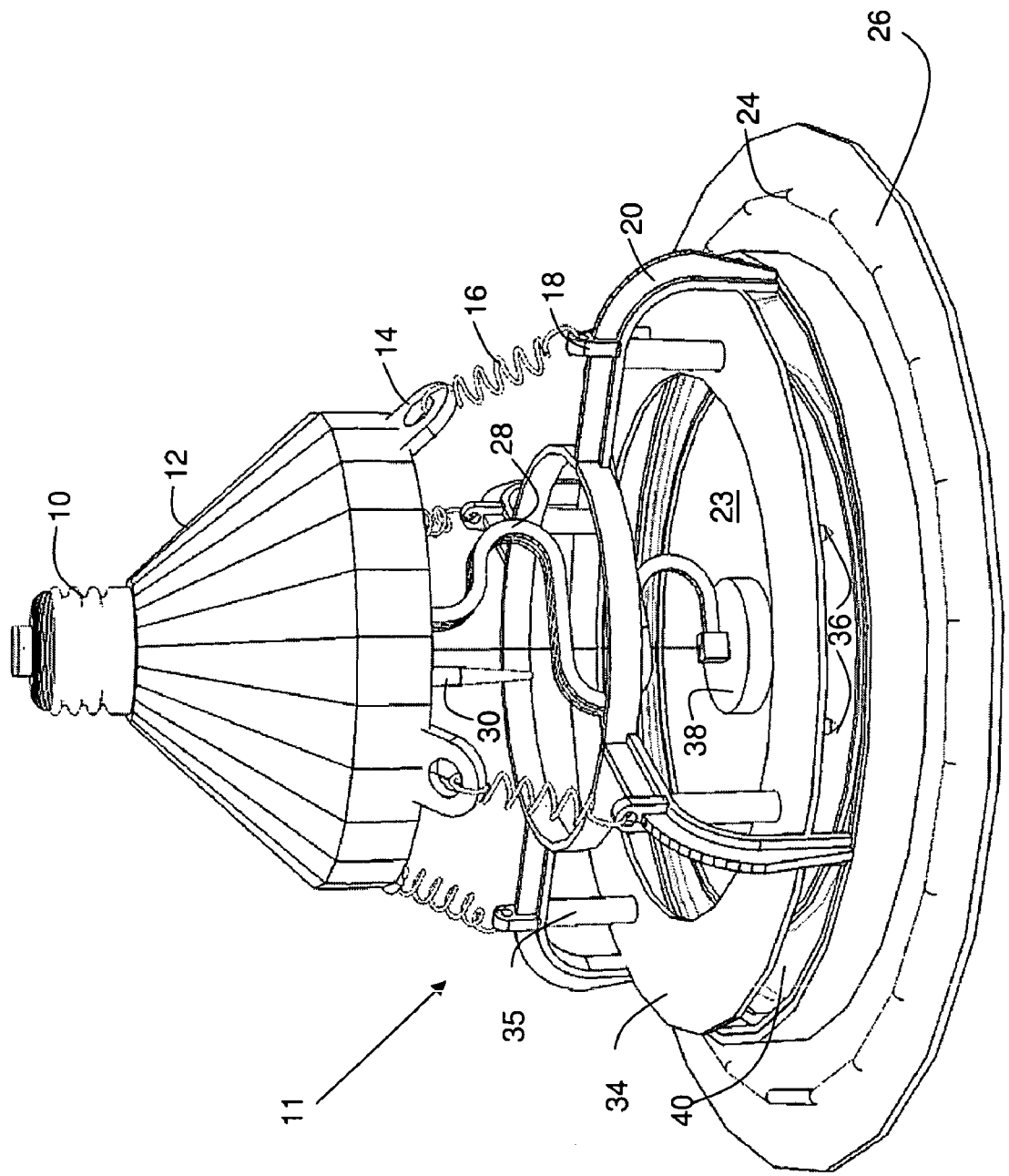
FIG. 6 is a perspective view of another alternative embodiment of the audio lamp using an opaque lamp cover.
Figure 7:
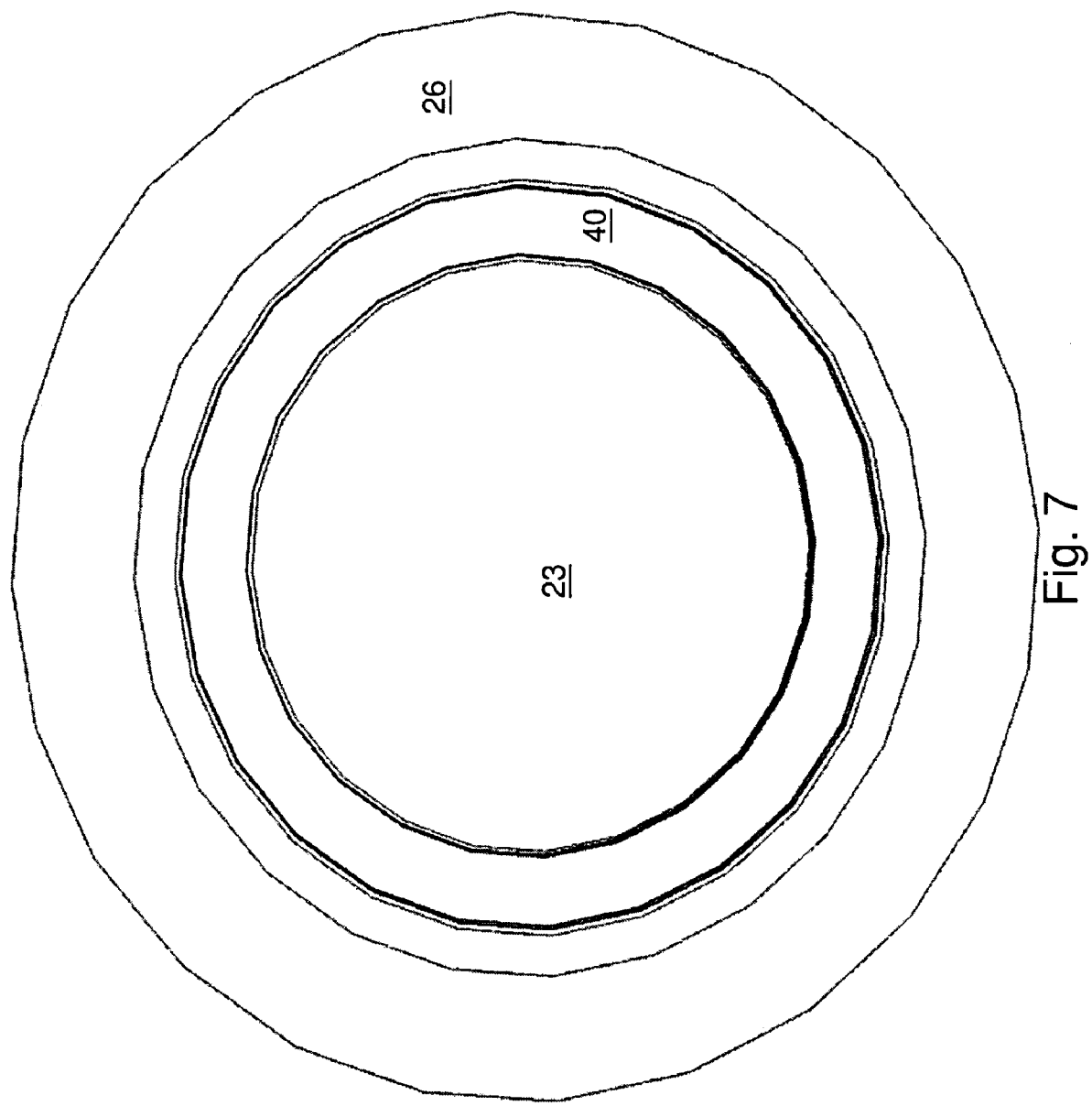
FIG. 7 is a bottom view of the embodiment of FIG. 6.
Figure 8:
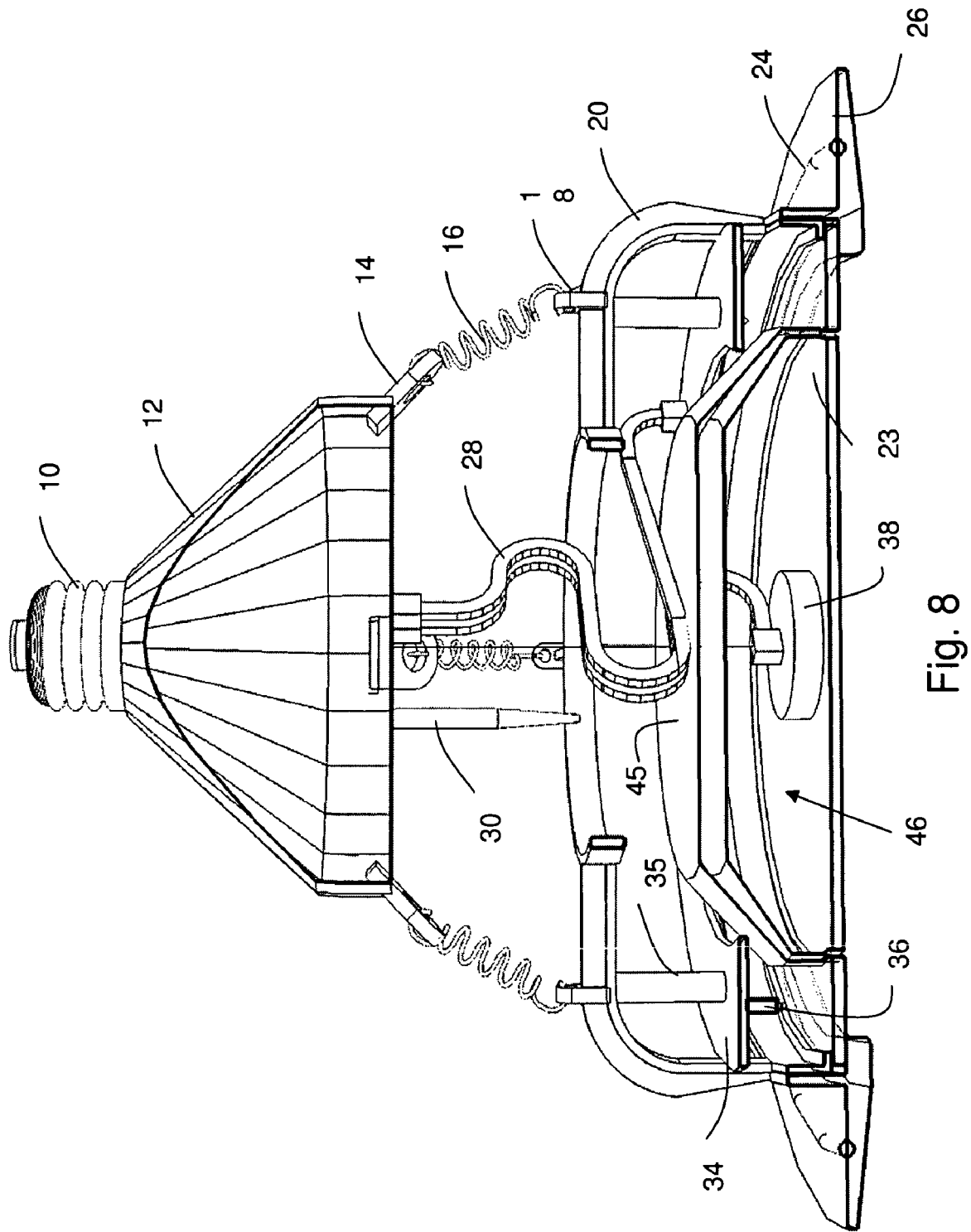
FIG. 8 is a cross sectional view of another embodiment having a chamber formed at the rear of a lamp cover.

In one embodiment as shown in FIGS. 6 and 7, the lamp cover is divided into an opaque portion and a translucent portion. The opaque lamp cover 23 is used as the distributed mode loudspeaker. A translucent cover 40 is provided outside the opaque lamp cover 23. The printed circuit board 34 is designed such that the LEDs 36 are directly above the translucent cover 40, facing downwards. Using an opaque lamp cover 23 as the distributed mode loudspeaker can provide a better sound quality. A material to use as the opaque lamp cover 23 is a urethane composite material. In another embodiment as shown in FIG. 8, a rear casing 45 is attached to the opaque lamp cover 23 at the back. Together with the opaque lamp cover 23, a sealed chamber 46 is formed. When the opaque lamp cover 23 vibrates, air inside the chamber 46 enhances the sound quality of the audio output. The exciter 38 is enclosed inside the chamber 46 so that the exciter 38 is still able to excite the opaque lamp cover 23 to produce acoustic waves.

Figure 9:
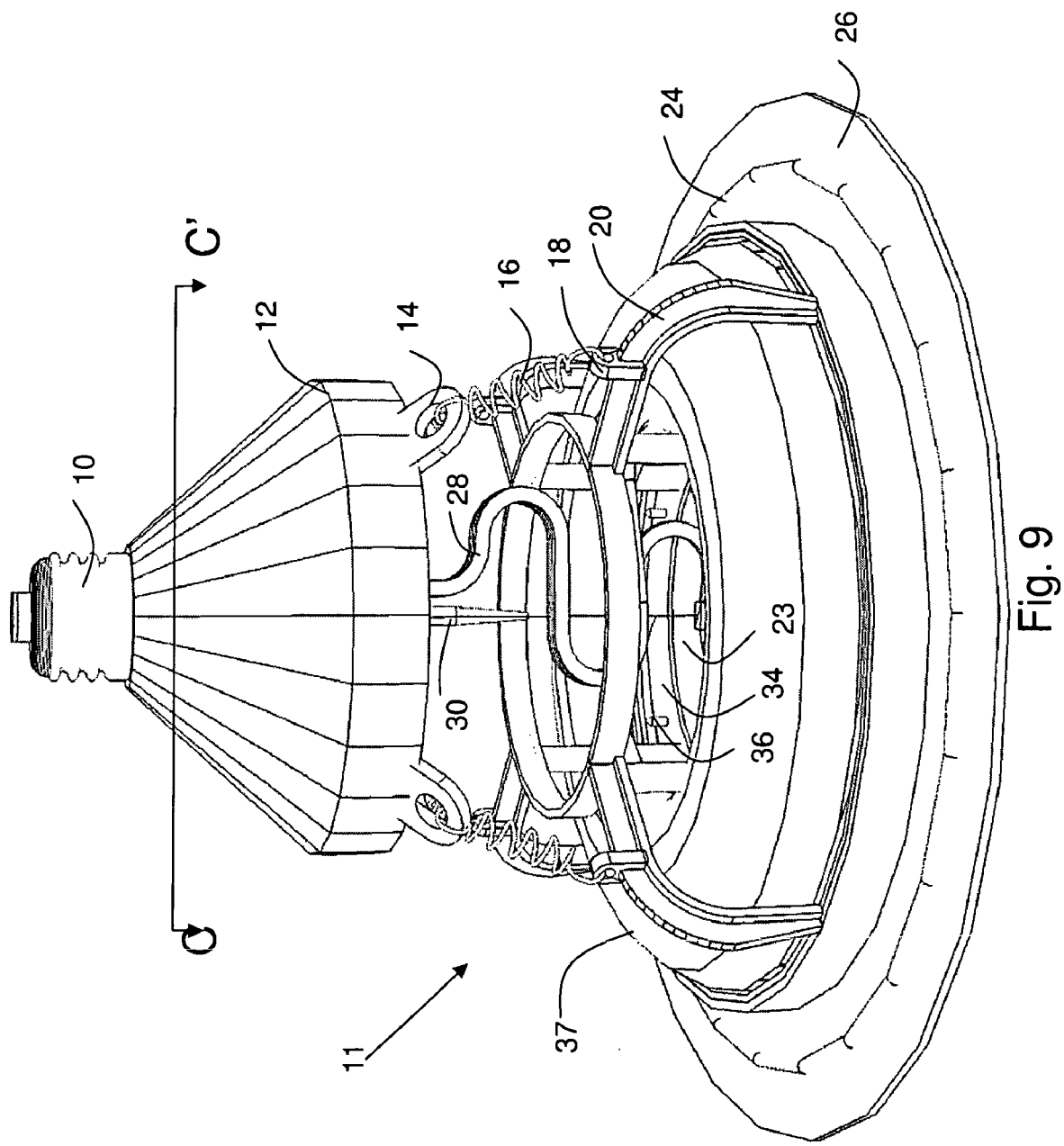
FIG. 9 is a perspective view of another embodiment utilizing a reflective surface inside the audio lamp.
Figure 10:
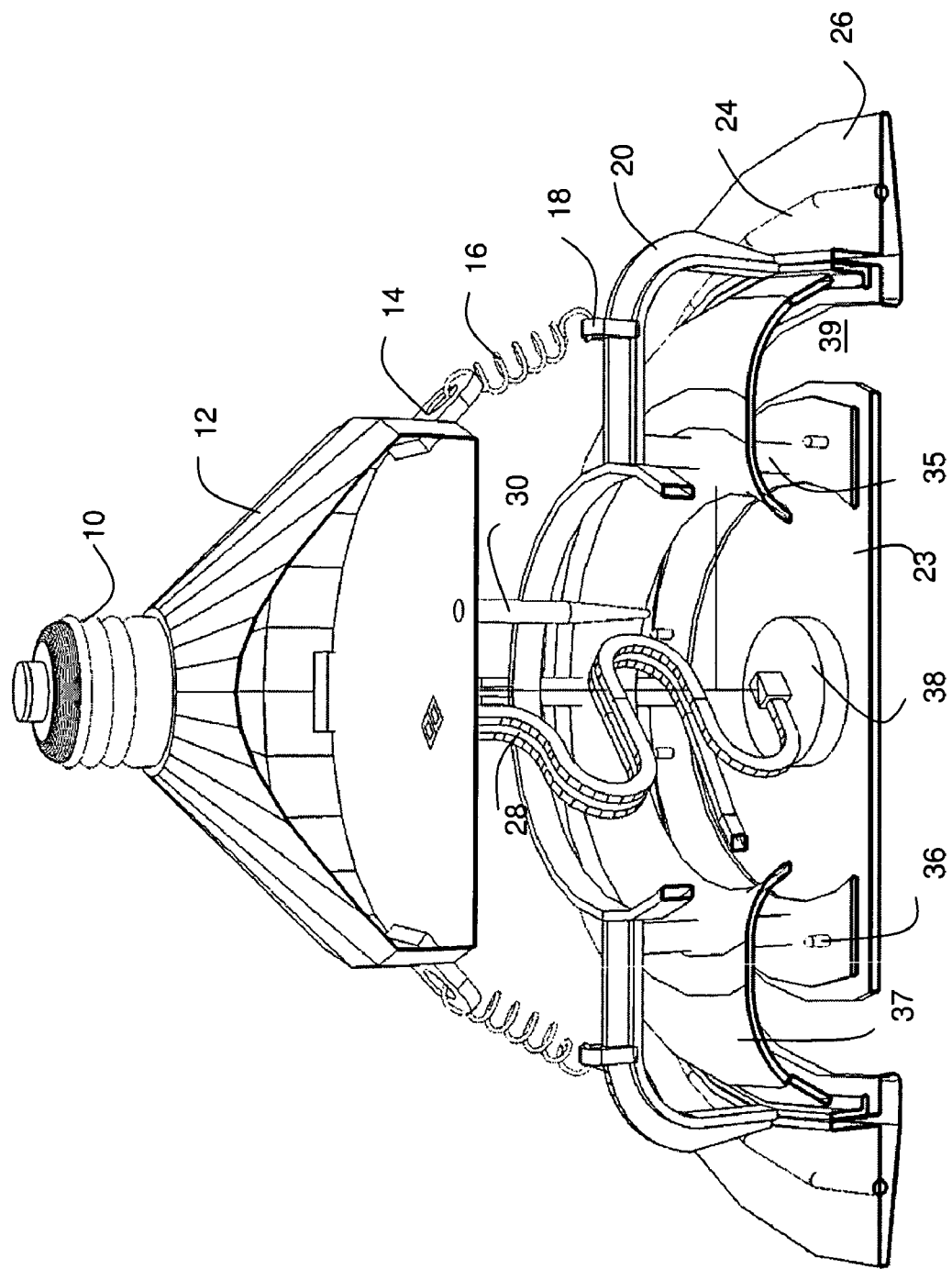
FIG. 10 is a cross-sectional view along the line C-C' of FIG. 9.

In an alternative embodiment as shown in FIGS. 9 and 10, there are no translucent elements in the whole lamp. The translucent cover 40 is removed, leaving an opening 39, and the opaque lamp cover 23 is used. The LEDs 36 are facing upwards instead of downwards on the printed circuit board 34 and the light is reflected downwards to the environment through the opening 39 using a reflective surface 37. The reflective surface 37 is shaped to redirect the most light while still allowing air flow for heat diffusion. In another embodiment, similar arrangement of the rear casing 45 as shown in FIG. 8 is attached to the opaque lamp cover 23. As mentioned previously, the chamber formed by the real casing and the opaque lamp cover 23 can improve sound quality.

In another embodiment, the lamp cover 22 of the audio lamp also acts as a microphone. When acoustic wave impinges on the lamp cover 22, it induces minute vibration on its surface. A transducer can pick up such vibration and convert it into electrical signal. As such, the electrical signal carries the audio information of the acoustic wave. As an exemplification, the lamp cover is made of glass material, and a laser pointer is used to emit a laser beam onto the lamp cover 22. At the point of contact of the laser beam and the lamp cover 22, the acoustic wave creates optical aberrations. This can then be picked up by a photocell. Hence, the photocell converts the audio signal into an electrical format. The latter can then be sent back to the electronic assembly via the electrical harness 28. In another embodiment, the sound-producing transducer assembly may be switched to operate as sound-inducing microphone. For example, the electronic assembly may configure the sound generating exciter 38 that excites the lamp cover 22 to produce acoustic wave to become a microphone that picks up acoustic wave. In other words, the audio lamp may switch between a 'speaking mode' and a 'listening mode'. In yet another embodiment, a separate microphone is integrated into the audio lamp, such as at the surface of the surface trim ring 26.

Instead of using LEDs as light-emitting elements, another embodiment is to use a film or sheet like substrate light source. For example, this can be the organic LED (OLED) or a fluorescent material. The film light source can also be adhered to the lamp cover 22 or even be the lamp cover itself. This allows a single surface to emit both light and sound simultaneously.

In another embodiment, the audio lamp is also equipped with one or more sensors. Depending on the type of sensors, they can be placed at the printed circuit board 34, near the housing 12, at the electronic assembly or on the surface trim ring 26. The sensor provides additional capability to the audio lamp and the sensor output is coupled to the electronic assembly. As one example, the sensor is a smoke detector so that the audio lamp can also serve as a fire-alarm detector. In another case, the sensor is an infrared sensor capable of detecting the presence of a warm object such as a human being inside a room. In yet another case, the sensor is an identity tag (ID tag) reader that can read a nearby ID tag. In this case, the audio lamp can detect the identity of the object that carries the ID tag. Not only can it be used to locate a person who wears the tag, it can also be used in other applications. For example, if a pet carries an ID tag enters a room equipped with an ID tag sensing audio lamp, the audio lamp can be configured to emit a signal to scare the pet out of the room. The signal could be a high frequency sound in the range of animal perception but not in humans' perception range. Alternatively, motion sensor, carbon dioxide detector, temperature sensor, humidity sensor, light sensor, video camera, or any combination of the above can also be used.

Figure 11:
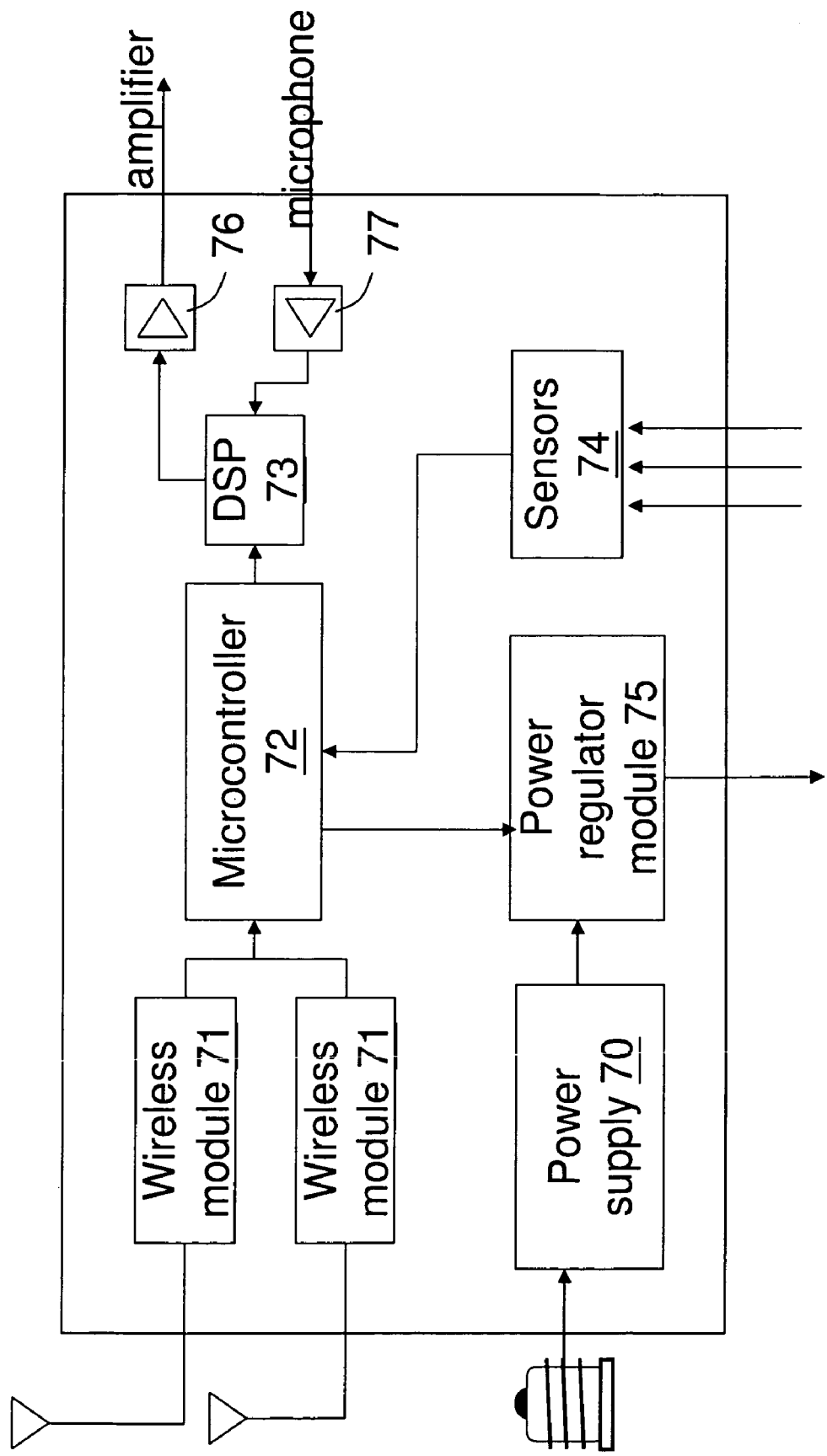
FIG. 11 is a block diagram of the electrical assembly according to an embodiment.

A block diagram of the electronic assembly is shown in FIG. 11. In one implementation, the electronic assembly comprises a power supply 70 that draws electrical power from the lamp socket that this audio lamp is affixed to. The power supply 70 provides the operational voltages and power to other modules, as well as the LEDs. Central to the electronic assembly is a microcontroller 72. It may be optionally equipped with Flash memory and/or Random Access Memory (RAM) to assist its operation. The software program in this microcontroller 72 serves to monitor and control other components/modules in the electronic assembly. There can be one or more wireless modules 71 connected to the microcontroller 72. Wireless module 71 may implement any wireless communication technology as its purpose is to exchange data with external sources or its peers. As an example, one of them may use radio frequency transmission to communicate with an external source or its peers; another one may use infra-red technologies to exchange data with another audio lamp, and/or an external remote control unit. For audio output, the microcontroller 72 routes the audio data received from one of the transceivers to a digital signal processing (DSP) chip 73, and then to the exciter 38 via a first amplifier 76. Likewise, for audio input, the audio signal from the microphone transducer will first be amplified in a second amplifier 77, then is routed to the microcontroller 72 via the DSP chip 73. The software in the microcontroller 72 may decide to send the audio signal to external host, or to its nearby peers through one of the wireless modules 71. Similarly, sensors 74 will also send their data to the microcontroller 72. The latter will also control and regulates the power sent to the LEDs or similar light-emitting elements via the power regulator module 75 so that the ON/OFF or dimming of the light can be under software control.

Figure 12:
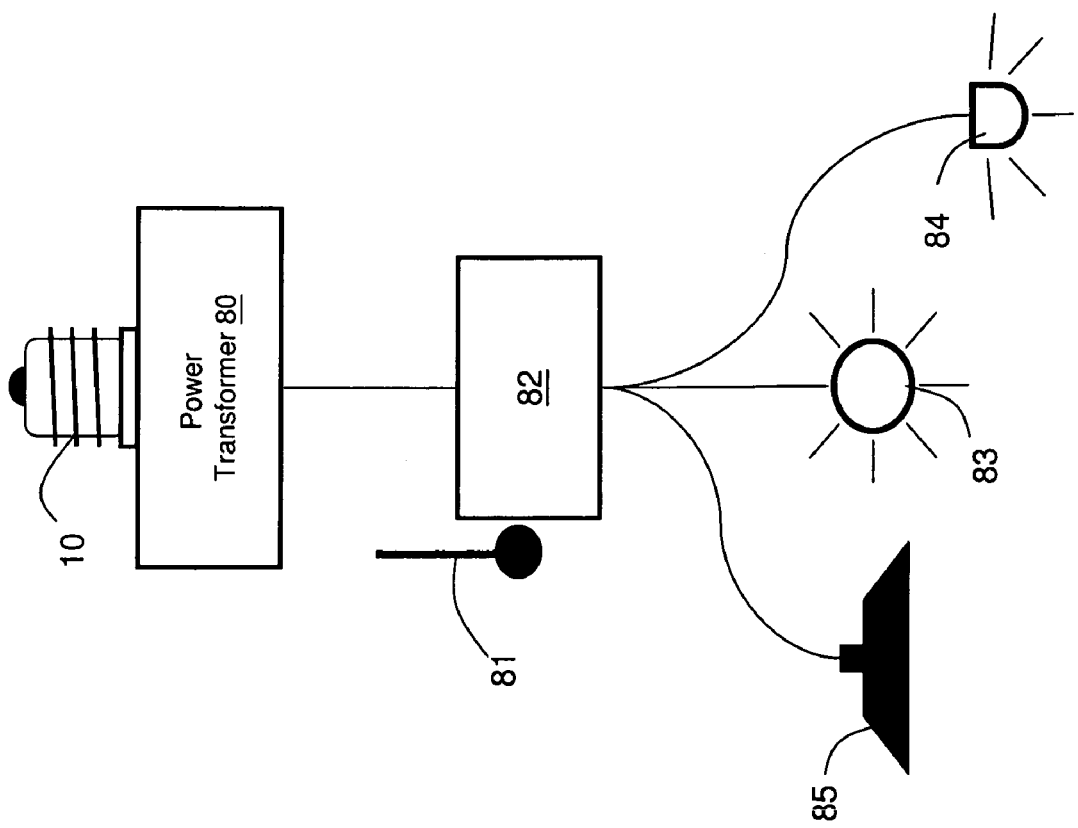
FIG. 12 is a diagram showing the electrical connection and signaling pathways of an audio lamp and its accessories according to an embodiment.

FIG. 12 depicts an electrical wiring and signal diagram between the electronic assembly and its accessories. Note that not all the components in FIG. 11 are shown here. The audio lamp has a screw thread contact 10 coupled to a power transformer 80. It supplies power to the electronic assembly 82. The latter is then electrically coupled to the other elements through electrical harness 28 as shown in previous figures. In this diagram, the connections to an infrared (IR) transceiver 84, a light source 83, a receiver 81 and a speaker-microphone 85 are shown. Although not explicitly shown in this figure, various sensors can also be connected to the electronic assembly in a similar fashion. In another embodiment, all components are mounted on a printed circuit board (PCB) and the electrical wiring and harnesses are not needed.

By combining audio and lighting into a single device and having a form-factor the same as a light bulb that can be mounted in a recessed lamp socket, the audio lamp can cut down plenty of electrical wiring in a household. As such, setting up a multi-speaker audio system at home can be as simple as replacing the existing light bulbs with this audio lamps. Since the audio signal is transmitting wirelessly from a source to the audio lamp, there is no additional wiring needed. Also, the distributed mode loudspeaker technology mentioned above generates sound field in all direction uniformly, thus achieving the omnidirectional characteristics that is hard to find in a conventional loudspeaker. When the audio lamp is equipped with various sensors, its highly-integrated and multi-function natures can further enable new applications and innovation that may not be easily realized otherwise.

Figure 13:
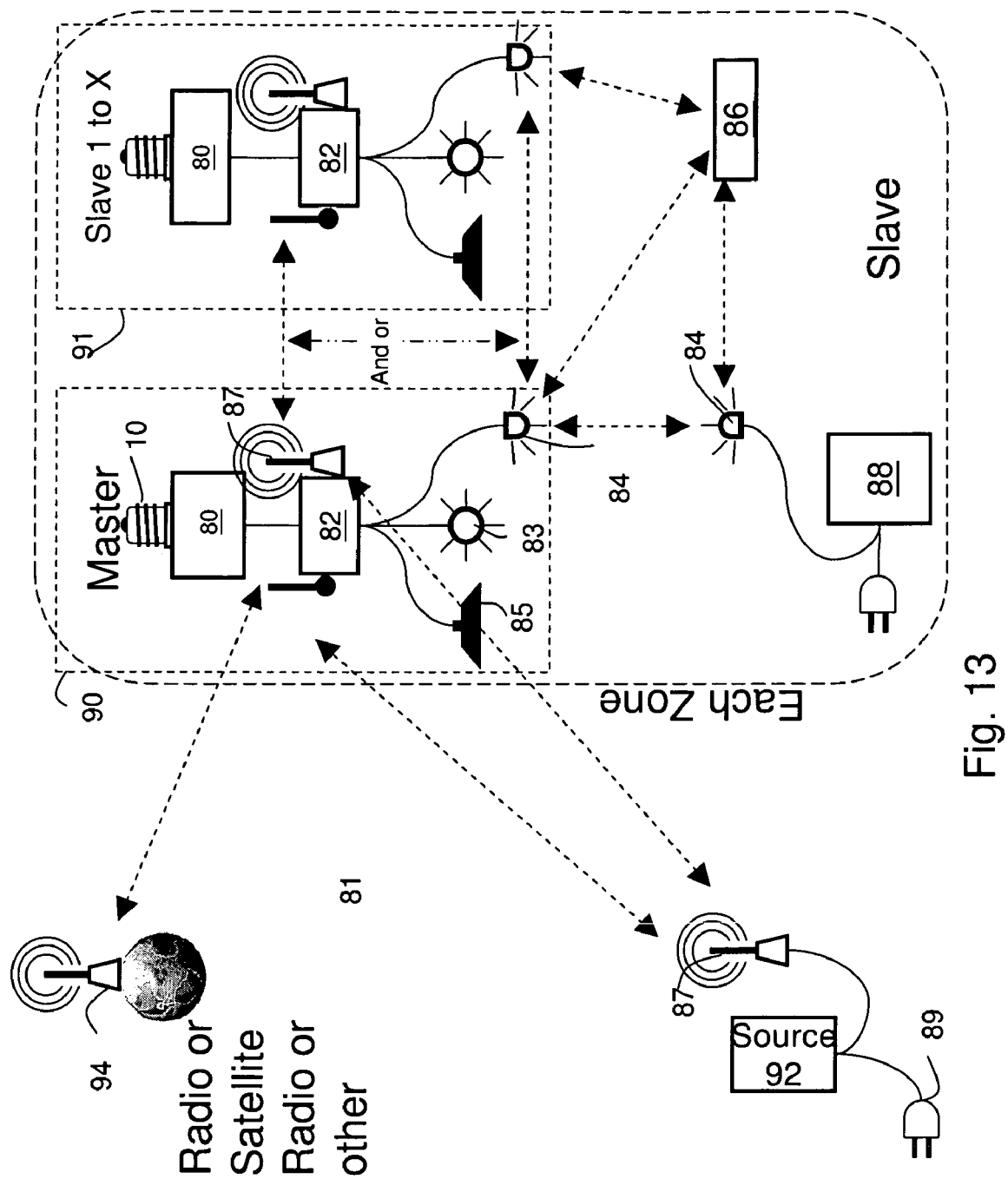
FIG. 13 is a conceptual diagram of an audio lamp system with master and slaves according to an embodiment.

In a residential and office building environment, the building is generally partitioned into multiple rooms and each room may have one or more ceiling lamps and lighting elements. When audio lamps are used, the audio lamps can be logically grouped into zones. FIG. 13 is one configuration. In an embodiment, each zone has at least one audio lamp; of which one of them serves as master 90 and the others are slaves 91. The master 90 receives data wirelessly at its transceiver 81 from a source 92 through a transmitter 87. The source 92 can be a stereo amplifier, a television, a personal computer or a video game console, or it can be a handheld portable device, a portable MP3 player, a telephone or a home entertainment system. It can also be AM, FM or satellite radio waves transmitted from a radio station 94. The master then forwards the data to the slaves 91 within the zone either using the transmitter 87 or a second transceiver 84. External devices, for example a woofer 88 as shown in the figure, can also receive the data through the second transceiver 84. A remote control 86, voice activation or light fixture can manipulate the devices in the zone.

Communication between the master 90, the source 92, the slaves 91 and the remote control 86 can be achieved using different wireless means. As an example, the master 90 may communicate with the source 92 using radio frequency (RF) transmission. This can be a dedicated RF link, or it can be a wireless network conforming to the international standards such as the Wi-Fi, Bluetooth, or Ultra-Wide-Band (UWB) standards. The communication between the master 90 and the slaves 91 may be through infrared. Likewise, the remote controller 86 may also use infrared to send control signal to the master 90. It is obvious to those skilled in the art that different choices of communication technologies and methods can be used between all parties and the above-mentioned example is but one illustration of how this can be achieved. Other wireless technologies not mentioned above, such as ultra-sound or optical, are also applicable in this case.

In another alternative embodiment, the aforementioned data communication can also be carried through the power-line between the source 92, the master 90 and the slaves 91. This is sometimes referred as 'power-casting'.

In one embodiment, all the data transmitted is encrypted so as to protect the privacy of the owner and also prevent unauthorized intrusion. Data is encrypted before transmission and decrypted at the receiving ends. User authentication procedure is also provided at the audio lamp so that only authorized personnel are allowed to configure it. This includes which zone this audio lamp belongs to as well as other system attributes or functions s.

Different configurations of audio lamps may be used within a zone. As an example, some of them may be a lamp-plus-loudspeaker, while others may act as a lamp-plus-microphone. Various sensors can also be incorporated to the audio lamps as mentioned before. Hence within a zone, the combination of multiple audio lamps as a whole can operates as (1)

a multi-channel loudspeaker system, (2) an array of microphones that can pick up human conversation and audio commands when the person is roaming in the room, (3) a sensor array or (4) any combination of the above.

In one embodiment, the assignment of which zone an audio lamp belongs to is determined during installation. For example, the zone is determined depending on the location of the device. Hence audio lamps in a kitchen are assigned to the same zone, whereas those in a bedroom are assigned to another zone. In another embodiment, the zone is determined by the relative distance to the masters. The masters are first installed and assigned a zone, and then the slaves will follow the zone of the closest master. In an alternative embodiment, zoning is achieved through configuration management software and re-zoning is possible using that software. In yet another embodiment, zoning is determined dynamically. For example, when the audio lamps are equipped with sensors that can detect the location of a person, then the audio lamps can be re-zoned dynamically depending on the where-about of that person. As an application example, the system can route the music, or a telephone conversation to the user when the user roams from one room to another in a building.

Figure 14:
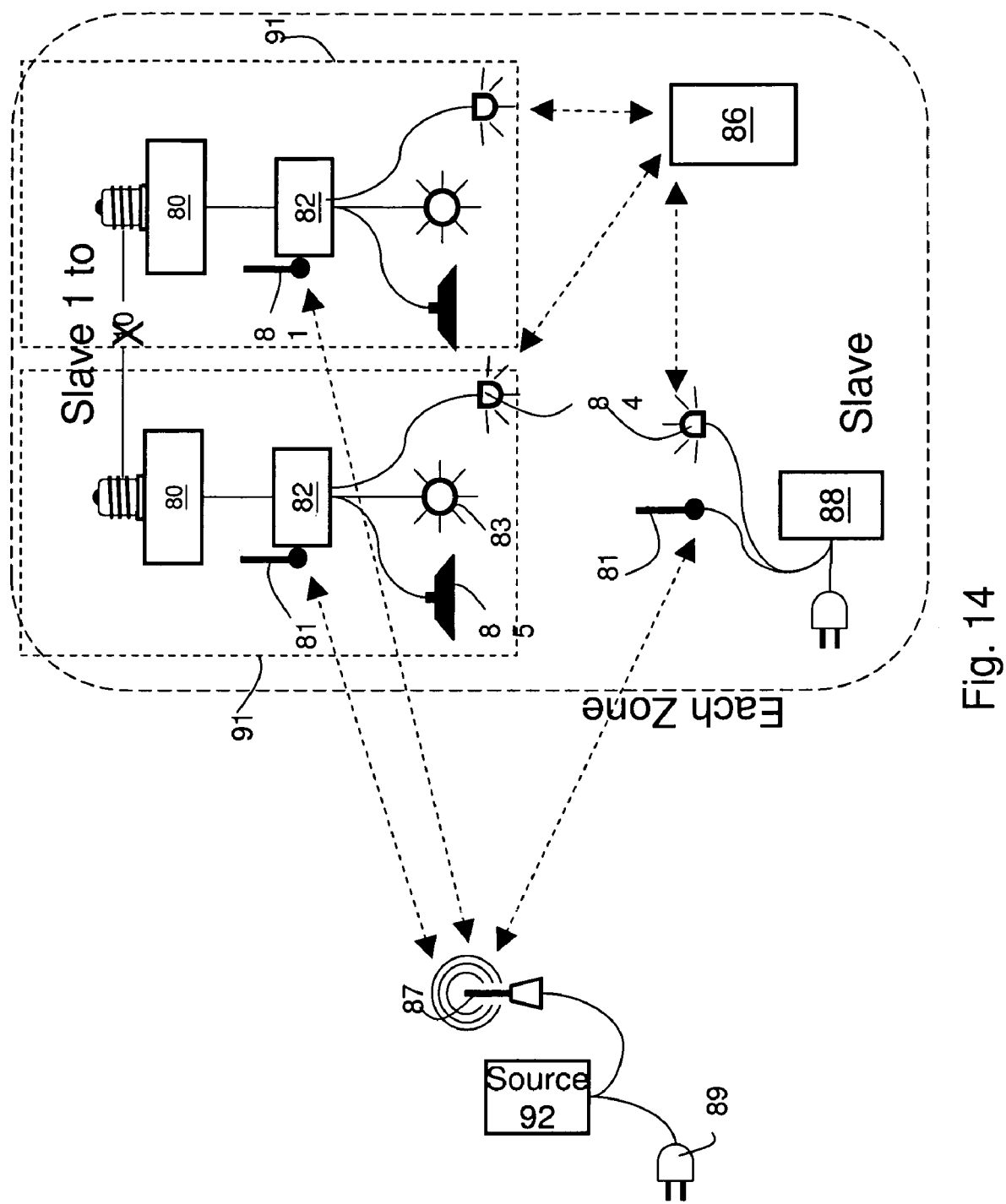
FIG. 14 is a conceptual diagram of an audio lamp system with all slaves according to an embodiment.

Referring to FIG. 14, another system is described below. The source 92 sends the data to every audio lamp in the zone wirelessly, so that transmitter 87 is eliminated from every device. That means all devices are slaves and there are no master. The remote control 86 still controls the devices.

Figure 15:
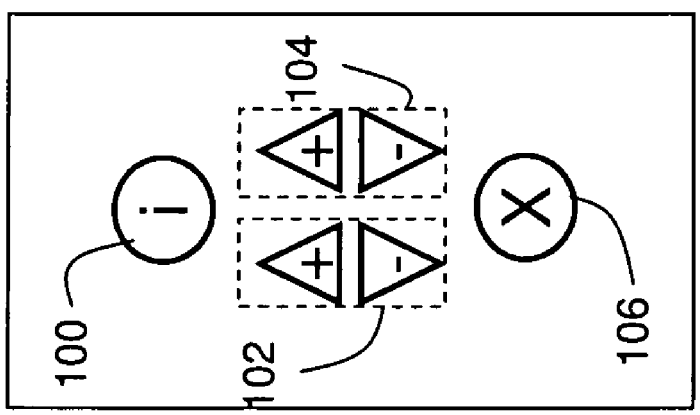
FIG. 15 is an embodiment of a wall switch of an audio lamp.

When installing the audio lamp, the wall switch that turns on the lamp may also be replaced by another switch dedicated for the audio lamp. FIG. 15 is a design of the replacement. In this design, there are two columns of up-down buttons. One column 102 is for controlling the luminance of the light, while the other 104 is to control the loudspeaker volume. The symbol (I) 100 is used to activate the intercom function (discussed later) while the (X) symbol 106 denotes the 'mute' or privacy function. Similar design can also be incorporated to the remote control 86. The arrangement in FIG. 15 is but one design. Based on the teaching of this invention, those skilled in the art can design a different button arrangement as well as adding more functionality to the wall switch or the remote control 86.

In one embodiment, the remote control 86 is attached to a wall mount. The remote control 86 acts like a wall switch in this case, able to control each of the lamps in the zone with appropriate buttons. In another embodiment, the remote control 86 is portable and the user can carry it around. In yet another embodiment, the wall mount act as a charger for the remote control 86, so that power can be recharged when the remote control 86 is not in use. In a further embodiment, the remote control 86 or other control units have a display unit so that the user can see various information or status of the audio lamp.

In the audio lamp setting, power is always supplied to the electronic assembly module. Hence the function of the replaced wall switch is not to cut off the electric power but to control the functionality of the audio lamp. To turn on or dim the light, the power-regulator module 75 in FIG. 9 is used. Hence the up-down button 102 first sends control signal to the microcontroller 72 of the electronic assembly inside the audio lamp, and the microcontroller 72 will regulate the power output to the light emitting element through the power-regulator module 75.

There are many potential applications of such system. For example, in a household, the source 92 could be a personal computer or a portable MP3 player with music stored in it. The source 92 can send the music wirelessly to the audio lamps for playing. As the music is played out from the lamps installed at the ceiling, extra space is not needed for a stereo set in the household.

In another application, the system is a multi-channel speaker system. Each audio lamp corresponds to one channel, and the source 92 transmits data for each channel to the devices. By changing the lamp cover material that emits audio sound, the audio lamp loudspeaker can be configured to respond to different audio frequency range. The system as a whole can also work with conventional loudspeaker systems. As shown in FIG. 11, a woofer 88 laid on the floor is incorporated as part of the multi-channel speaker system. In this example, the woofer 88 also receive signal from the master through a wireless means. However, those skilled in the art can use different combinations to configure different loudspeaker systems.

In another example, the system operates as a security alarm system. At least one device is dedicated as a microphone sensor. When a trespasser breaks a window or walks into a monitored area, the device detects the sound generated and sends a trigger signal to the other devices or the source 92. An alarm signal is pre-saved into the lamps inside the flash memory, and the devices will play the alarm signal when they receive the trigger signal. The light can then switch on, and the source 92 may contact a security company automatically when the trigger signal is received. The same approach works if the audio lamp incorporates a smoke detector so that fire-alarm warning may be activated when high level of smoke concentration is detected. In the later case, the system as a whole may send out an audio instruction to all zones on the safe path to exit the building, and turn on the lights of only those audio lamps along the safe exit path.

In yet another example, the system operates as a baby monitor. One of the devices that are in the baby's room is dedicated as a sound sensor. When the baby cries, the sound sensor detects the crying noise and sends to the source 92. The source 92 can either send a soothing music piece to the devices in that zone to play to the baby and/or notify the parents that are at another zone.

In one example, the source 92 possesses voice recognition and speech recognition ability. When the user says a command, a microphone sends the signal to the source 92, afterwards the signal is analyzed to see if it is a registered user's voice and if the speech is a valid command. If the voice is registered and the command is valid, an appropriate signal is transmitted to the lamps. For example, when the user says 'turn off the light', the lamps in that zone will turn off. Or when the user says 'contact person A', the source 92 will dial the corresponding number and the audio lamp will become a microphone.

In one application, the system operates as a hands-free telephone. A user carries the remote control, which detects the distance from all audio lamps from time to time. The audio lamp that is closest to the user is automatically switched as a microphone, and whatever the user speaks can be transmitted through the telephone line connected to the system. The other devices in the zone still functions as a speaker to output incoming voice. If the user moves to another location or another zone, a different device will be activated as the microphone.

In one example, the system is an intercom system. A device detects voice from a person at a location, for example outside the house, and another device in a different zone outputs the voice where someone in the house can communicate with that person.

The system can also act as a simple intelligent lamp. A device detects the ambient light luminance and sends the information to the master. Depending on the luminance information, a number of lamps in the zone can switch on until the luminance is above the threshold.

This system can also be a tracking system. One example is a device equipped with an infrared (IR) detector that senses the presence of a human or an animal from the IR wave they emit. When more devices are equipped with the IR detector, a triangulation algorithm may be used to pin-point the location of the human or animal. The device can also sense the voice the human makes while they are moving by being a microphone. Alternatively, powered IR tag can be used.

Separately, object tracking can also be accomplished when the audio lamp is equipped with the ID tag reader mentioned previously. In one embodiment, radio frequency identification (RFID) technology may be used. For example, active RFID tag (RFID tag with battery) can be used to achieve a longer read distance. When the active RFID tag is a Wi-Fi-based active RFID tag, the corresponding reader at the audio lamp may be a conventional Wi-Fi access point.

Another application of this invention is as a surveillance camera with audio input. A video camera as well as a microphone is installed at the audio lamp. The video camera has an infra-red emitter that enhances the image so that the video camera can be used as a night vision camera. Video data and audio data are captured at the video camera and the microphone respectively. The data are then forwarded to an external host or other devices using existing electrical wires or wireless communication.

The embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the shape of the light cover 22 and the translucent cover 40 are described as circular and round in FIGS. 1, 2, 3, 4, 6 and 7 above, but it is clear that other shapes and sizes may be used according to the user's preference, such as oval, square, rectangular in shape. Similarly, the opaque lamp cover 23 is shown at the center in FIGS. 6 and 7; and the translucent portion 40 is at the outer ring. This, however, can be reversed. In fact, the opaque and translucent portions need not be concentric rings. They can be made of different shapes and sizes to appeal to different consumers' tastes.

While distributed mode loudspeaker technology is described in previous paragraphs, loudspeakers based on other kinds of sound-emitting technologies can also be used. For example, one or more electromechanical loudspeaker can be used in lieu of the opaque lamp cover 23 and the exciter 38 in FIGS. 9 and 10. As an example, the opaque lamp cover 23 is replaced by a grill of a speaker and there is a small speaker housing behind the cone to enclose it. In this example, the loudspeaker is mounted in the front of the audio lamp and the acoustic wave propagates directly in front of the lamp. This gives better acoustic effect compared to other configurations where the loudspeaker is mounted at the back of the lamp. In another embodiment, loudspeakers with different frequency responses can be installed in different audio lamps. Some of them may serve as tweeters, others mid-range loudspeakers or woofers. When there are a few of such audio lamps installed in a room, the user can then fine tune this multi-speaker system to generate a sound field that mimics a certain acoustic environment. This may be an outdoor environment, a theater environment, or a concert hall environment.

In the embodiments described above, the audio lamp resembles a screw-type light bulb. It is clear the audio lamp and the connector can resemble other types of light bulbs, for example a bayonet-type bulb.

In the embodiments described above, the lamp cover either functions as a speaker or a microphone. It is within the knowledge of an ordinary person skilled in the art to add a separate microphone inside the lamp so that a single lamp can function as both at the same time. Moreover, the DSP chip 73 inside the electronic assembly can be programmed to cancel out those microphone input signal that is due to the loudspeaker output.

Furthermore, the vibration dampening parts need not be springs 16 and insulating gasket 24, as long as it serves the purpose of eliminating the vibration at the light socket as much as possible.

Although the source 92 mentioned above is mainly an audio source, it should not be construed as the only source that can be used in this system. In fact, the source can be a gateway to the Internet. In this case, the baby-monitoring scenario can be extended to an application that becomes a personalized assistance to senior citizens staying at home alone. Any abnormal signals detected by any sensor in any audio lamps installed in the house can be sent via the Internet to his relatives, or to the hospital or similar organizations that can provide assistance. In this sense, remote monitoring and control of a building is made possible.

We claim:
1. An audio lamp apparatus comprising:
a housing;
a base socket provided on an upper portion of the housing;
suspension elements extending from a lower portion of the housing;
an armature supported by the suspension elements;
a surface ring and a printed circuit board supported by the armature, wherein the printed circuit board is electrically connected to the base socket;
a plurality of light emitting diodes provided on the printed circuit board;
a lamp cover supported by the surface ring; and
an exciter provided on the lamp cover and electrically connected to the circuit board.
2. The audio lamp apparatus according to claim 1, wherein:
the suspension elements comprise a plurality of springs.
3. The audio lamp apparatus according to claim 1, further comprising:
a circumferential flange extending outwardly from the surface ring; and
a gasket covering a peripheral surface of the flange.
4. The audio lamp apparatus according to claim 1, wherein:
the lamp cover comprises both an opaque region and a translucent region.
5. The audio lamp apparatus according to claim 4, wherein:
the opaque region is surrounded by an annular translucent region.
6. The audio lamp apparatus according to claim 1, wherein:
the printed circuit board exhibits an annular configuration.
7. The audio lamp apparatus according to claim 6, further comprising:
a rear casing attached to a central portion of the lamp cover, the rear casing and the lamp cover defining a sealed chamber containing the exciter.
8. The audio lamp apparatus according to claim 6, further comprising:
a reflector element arranged for directing light from light emitting diodes in a direction away from the housing.

9. The audio lamp apparatus according to claim 5, wherein:
the opaque region comprises a first material and the translucent region comprises a second material and the first and second material exhibit different acoustical characteristics.

10. The audio lamp apparatus according to claim 1, wherein:
the exciter is a transducer configured for operation in a speaker mode in which whereby electrical signals received by the transducer will drive the lamp cover to produce sound or a microphone mode in which ambient sound which drives the lamp cover will be received by the transducer and converted to electrical signals corresponding to the ambient sound.

11. An audio lamp apparatus comprising:
a housing;
a base socket provided on an upper portion of the housing;
suspension elements extending from a lower portion of the housing;
an armature supported by the suspension elements;
a surface ring and a printed circuit board supported by the armature, wherein the printed circuit board is electrically connected to the base socket;
a plurality of light emitting diodes provided on the printed circuit board;
a lamp cover supported by the printed circuit board; and
an exciter provided on the lamp cover and electrically connected to the circuit board.

12. The audio lamp apparatus according to claim 11, further comprising:
a reflector element arranged for directing light from light emitting diodes in a direction away from the housing.

13. The audio lamp apparatus according to claim 11, wherein:
an annular opening is defined between the printed circuit board and the surface ring, the reflector element being arranged for directing light from light emitting diodes provided on an upper surface of the printed circuit board through the annular opening.

14. An audio lamp apparatus comprising:
a light-emitting element;
a sound-emitting element;
a control circuit operatively connected to the light-emitting element and the sound-emitting element;
a light reflecting element that reflects light from the light emitting element in a plurality of directions, the light reflecting element having a generally toroidal arcuate profile; and
a base socket;
wherein the base socket is configured for engaging a conventional lighting socket and transmitting power to the light emitting element, the sound emitting element and the control circuit.

* * * * *